United States Patent
Matsubayashi

(10) Patent No.: US 10,097,890 B2
(45) Date of Patent: Oct. 9, 2018

(54) SYSTEM AND METHOD FOR VIRTUAL INPUT AND MULTIPLE VIEW DISPLAY

(75) Inventor: Koji Matsubayashi, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/048,059

(22) Filed: Mar. 15, 2011

(65) Prior Publication Data
US 2012/0236210 A1    Sep. 20, 2012

(51) Int. Cl.
| | |
|---|---|
| H04N 21/41 | (2011.01) |
| H04N 21/462 | (2011.01) |
| H04N 21/436 | (2011.01) |
| H04N 21/431 | (2011.01) |
| H04N 21/4363 | (2011.01) |

(52) U.S. Cl.
CPC ..... H04N 21/4622 (2013.01); H04N 21/4126 (2013.01); H04N 21/4312 (2013.01); H04N 21/43637 (2013.01)

(58) Field of Classification Search
CPC ... A63F 13/12; A63F 13/20; H04N 21/42204; H04N 21/42653; H04N 21/4316; H04N 21/4363; H04N 21/4402; H04N 21/4622; H04N 5/44591; H04N 5/45; H04N 21/4104; H04N 21/43635; H04N 21/482; H04N 5/765; H04N 21/4126; H04N 21/4312; H04N 21/43637
USPC .......... 725/37, 40, 43, 80–81; 348/563–564; 463/39–40
See application file for complete search history.

(56) References Cited

U.S. PATENT DOCUMENTS

| | | | |
|---|---|---|---|
| 6,313,880 B1 | 11/2001 | Smyers et al. | |
| 7,945,701 B2 * | 5/2011 | Dai | H04N 21/4104 348/552 |

(Continued)

FOREIGN PATENT DOCUMENTS

| | | |
|---|---|---|
| CN | 101291398 A | 10/2008 |
| CN | 101394494 A | 3/2009 |
| CN | 101662607 A | 3/2010 |

OTHER PUBLICATIONS

"Wireless PC to TV" —internet article—Jun. 1, 2009, downloaded from the internet on Jul. 5, 2010 from http://askbobrankin.com/wireless_pc_to_tv.html, 2 pages.

(Continued)

Primary Examiner — Pankaj Kumar
Assistant Examiner — Alazar Tilahun
(74) Attorney, Agent, or Firm — Haverstock & Owens LLP

(57) ABSTRACT

A system and method for multi-view output of one or more wireless portable devices. The system includes a device, such as a TV, that has a processor, a wireless transceiver coupled to the processor, and programming executable on said processor. The programming is configured for carrying out the steps of: receiving a first wireless output signal from a first portable device with the wireless transceiver; receiving a second wireless output signal from a second portable device with the wireless transceiver; identifying the first portable device and second portable device; displaying the identity of the first portable device and second portable device in an input list comprising one or more inputs; selecting the first portable device and second portable device for output on a display; and displaying the first wireless output signal simultaneous with the second wireless output signal on the display.

26 Claims, 4 Drawing Sheets

(56) References Cited

U.S. PATENT DOCUMENTS

| | | | |
|---|---|---|---|
| 2005/0066068 A1* | 3/2005 | Karaoguz | G06F 3/14 710/1 |
| 2007/0083888 A1* | 4/2007 | Liebhold | H04N 5/44513 725/37 |
| 2009/0094646 A1* | 4/2009 | Walter et al. | 725/48 |
| 2010/0079670 A1* | 4/2010 | Frazier | H04N 5/44591 348/564 |
| 2010/0113148 A1* | 5/2010 | Haltovsky et al. | 463/30 |
| 2010/0331082 A1* | 12/2010 | Kim | A63F 13/12 463/30 |

OTHER PUBLICATIONS

Internet specification sheet for SuperView 4000—2008—downloaded from the internet on Jul. 5, 2010 from http://www.rgb.com/products/SuperView4000/, 2 pages.

Parr, B.—"Wireless Revolution: Wi-Fi Between Devices Coming in 2010"—internet article—Oct. 14, 2009, downloaded from the internet on Jul. 5, 2010 from http://mashable.com/1009/10/14/wi-fi-direct/, 4 pages.

First Office Action for the Chinese Application 201210036112.3.

The Second Office Action for the Chinese Application 201210036112.3.

The Third Office Action for the Chinese Application 201210036112.3.

The Search Report for the Chinese Application 201210036112.3.

* cited by examiner

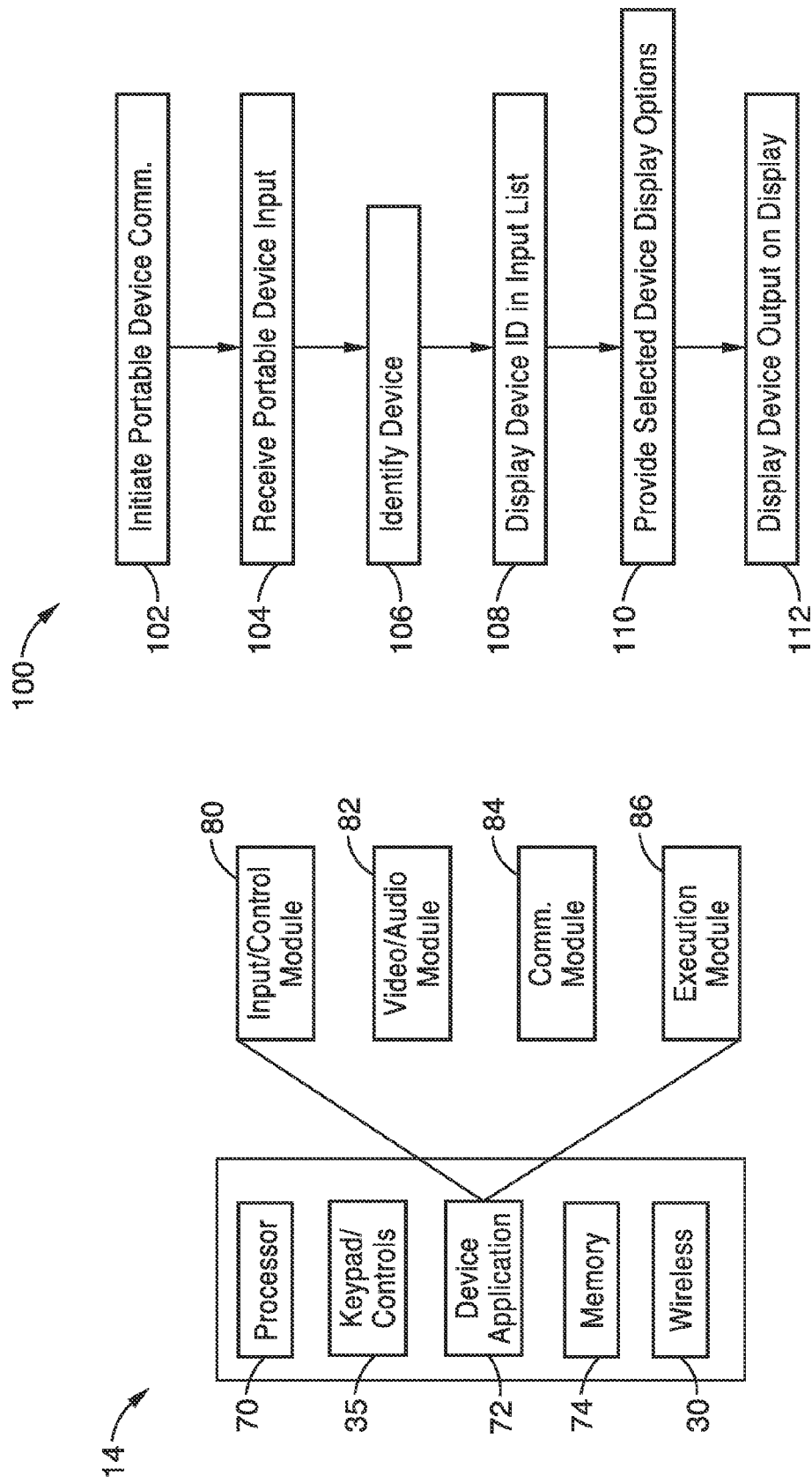

SYSTEM AND METHOD FOR VIRTUAL INPUT AND MULTIPLE VIEW DISPLAY

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to video processing, and more particularly to video processing of a plurality of simultaneous wireless signals.

2. Description of Related Art

TV's generally comprise a plurality of inputs that allow a user to select from to view video from the TV. However, simultaneous viewing of output from a plurality of wireless devices is not available.

Accordingly, an object of the present invention is a system for receiving input from a plurality of wireless portable devices in an external input list, and displaying the output of the devices simultaneously.

At least some of these objections will be met in the following description.

BRIEF SUMMARY OF THE INVENTION

The present invention comprises a system that may be added to or coupled to a home network (e.g. Wi-Fi, Bluetooth) device as an input to the external input list and display the selected device's screen with multi windows on the TV screen. Detected devices on a wireless network show up in the external input list of the TV. The user can select the devices as inputs and can watch output of the devices on the TV screen, with single (full) screen if one device is selected or with multiple windows (e.g. split screen) if multiple devices are selected.

In one embodiment, multiply portable devices, e.g. 2 or more PSPs (Play Station Portable), are on the network and detected as Wi-Fi/Blue-tooth devices, screen images of the PSPs can be displayed on the TV screen at same time. Game players with the PSPs can share a large TV screen in split-screen mode.

One aspect of the invention is a system and method for multi-view output of one or more wireless portable devices. The system includes a device, such as a TV, that has a processor, a wireless transceiver coupled to the processor, and programming executable on said processor. The programming is configured for carrying out the steps of: receiving a first wireless output signal from a first portable device with the wireless transceiver; receiving a second wireless output signal from a second portable device with the wireless transceiver; identifying the first portable device and second portable device; displaying the identity of the first portable device and second portable device in an input list comprising one or more inputs; selecting the first portable device and second portable device for output on a display; and displaying the first wireless output signal simultaneous with the second wireless output signal on the display.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

FIG. 4 shows a schematic view of a portable device configured to be coupled to wirelessly output to a TV in accordance with the present invention.

FIG. 5 shows a flow diagram of a method for receiving a plurality of wireless devices as an input for multi-view display on a TV.

DETAILED DESCRIPTION OF THE INVENTION

Referring more specifically to the drawings, for illustrative purposes the present invention is embodied in the apparatus generally shown in FIG. 1 through FIG. 5. It will be appreciated that the apparatus may vary as to configuration and as to details of the parts, and that the method may vary as to the specific steps and sequence, without departing from the basic concepts as disclosed herein.

Figure 1:
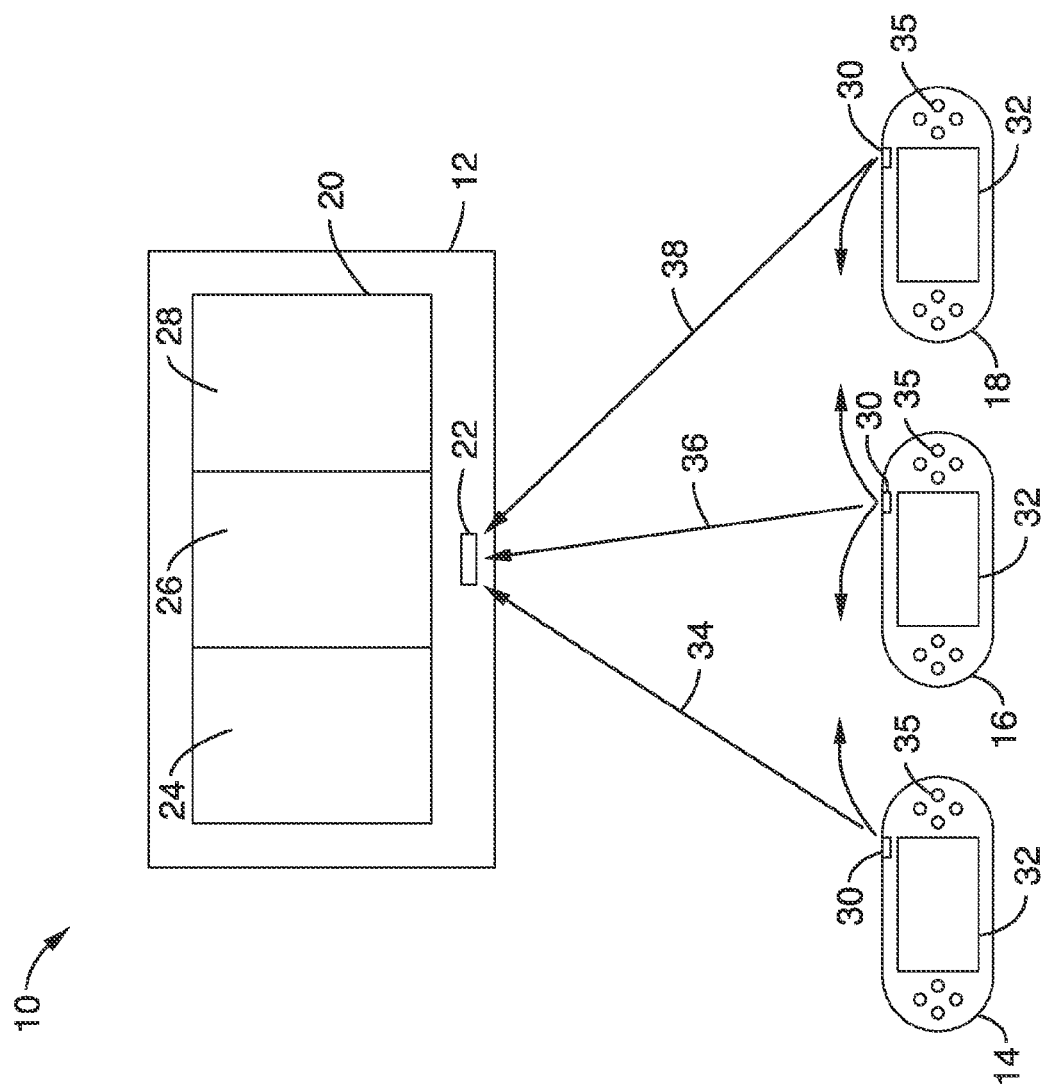
FIG. 1 shows a system including a plurality of wireless devices having outputs that are wirelessly input into a TV for split screen display in accordance with the present invention.

FIG. 1 shows a system 10 wherein a plurality of wireless devices 14, 16 and 18 with outputs that are wirelessly input into a TV 12 for split screen display in accordance with the present invention.

FIG. 1 illustrates three portable devices 14, 16, and 18 (e.g. PSPs) that are wirelessly coupled to the TV 12 (e.g. via Wi-Fi, Bluetooth, or like wireless connection). It is appreciated that portable devices 14, 16, and 18 may comprise any wireless device, (e.g. cell phone, PDA, video gaming console, etc.) that is capable of outputting a signal for wireless reception and viewing via TV 12. It is also appreciated that any number of wireless devices may be coupled to TV 12 as an input to the TV for viewing on the TV display 20.

TV 12 comprises a wireless receiver 22 configured to receive output signals 34, 36, and 38 that are output from wireless transceivers 30 of portable devices 14, 16, and 18. Output signals 34, 36, and 38 may comprise video and/or other data that may generally be configured to by output from the display 32 of the portable device, and manipulated by controls 35 located on the portable device (e.g. game mode or the like).

As shown in FIG. 1, the output of TV 12 display 20 is split into three horizontally aligned windows 24, 26, and 28 corresponding to the number of devices being input into the TV at a given viewing session.

Figure 2:
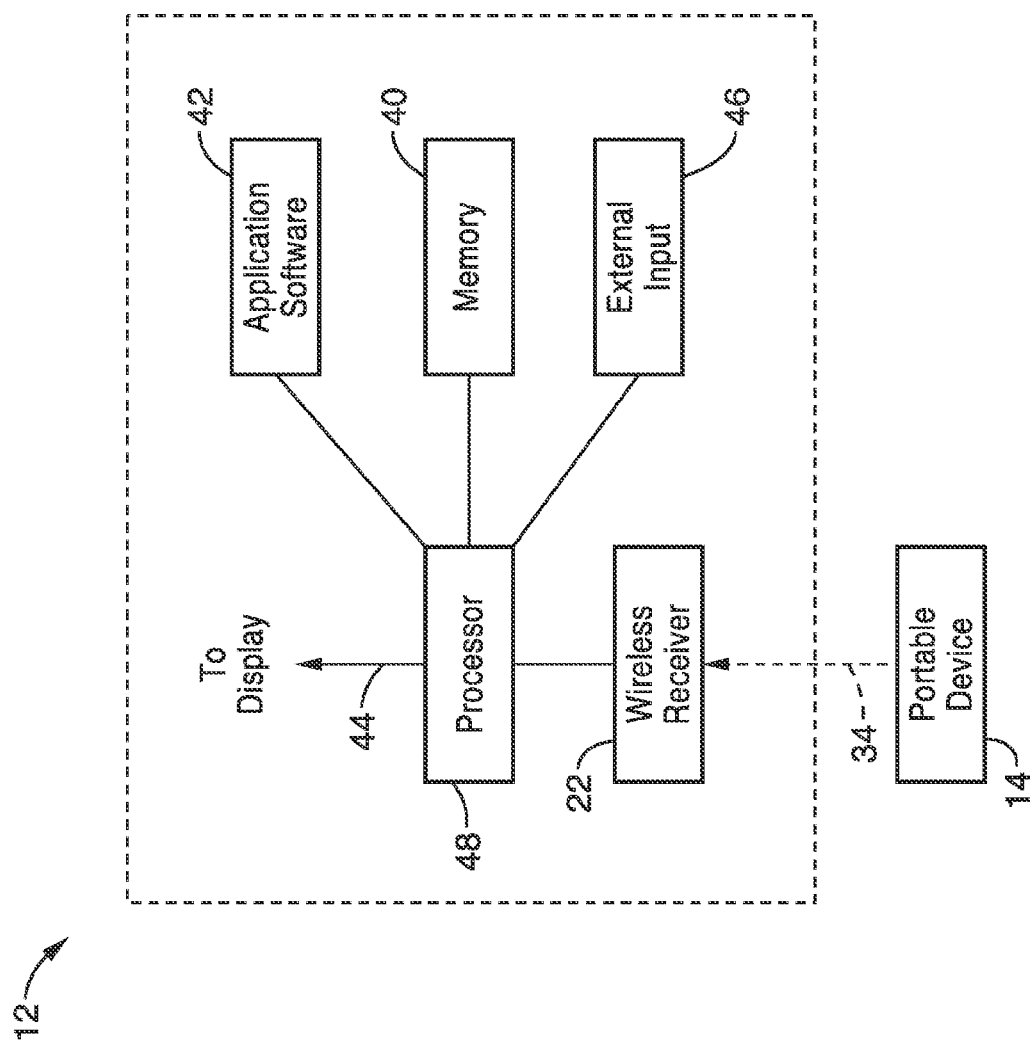
FIG. 2 illustrates a schematic diagram of a TV configured with wireless multi-input and display in accordance with the present invention.

FIG. 2 illustrates a schematic diagram of a TV 12 configured with wireless multi-input and display in accordance with the present invention. TV 12 will generally comprise a wireless receiver, that is configured to receive a wireless signal 34 (e.g. Wi-Fi, Bluetooth or the like) from portable device 14. The TV will comprise application software 42 executable on processor 48, wherein application software 42 is configured to allow the device to be received in an input list (see FIG. 3) of the TV 12 and output the devices signal as a modified signal 44 to the display 20 of the TV 12.

The TV will comprise a memory module 40 configured to store the application software 42, and any other user settings or configurations that pertain thereto. TV 12 may also comprise one or more external inputs (e.g. wired inputs) 46 that may populate the input list.

Figure 3:
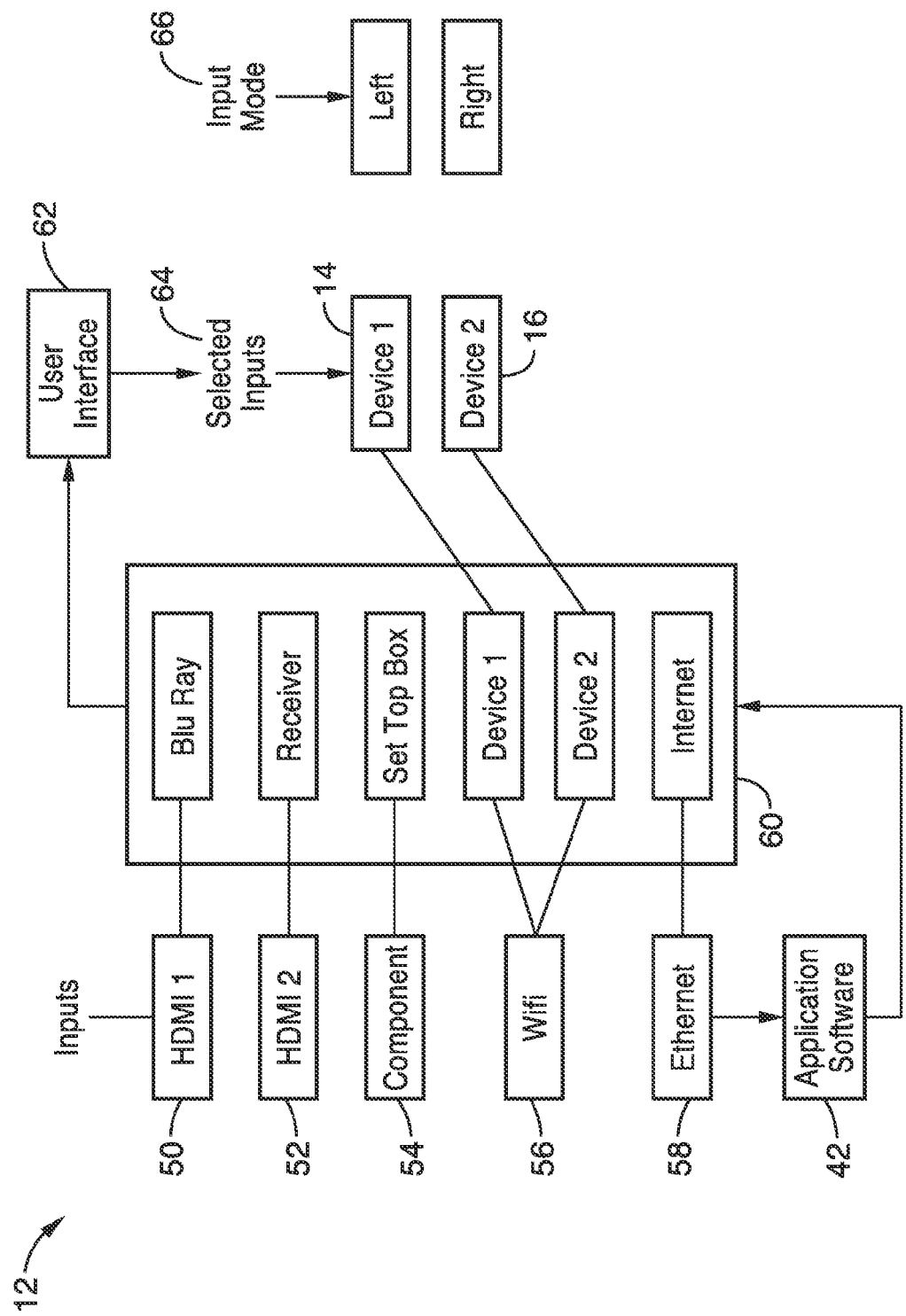
FIG. 3 illustrates a schematic diagram of the inputs of the TV shown in FIG. 2.

FIG. 3 illustrates a schematic diagram of the inputs of the TV 12 shown in FIG. 2. TV 12 may comprise a plurality of wired inputs (e.g. HDMI1 50, HDMI2 52, component 54, Wifi input 56, Ethernet input 58, etc.). Application software populates the input list 60 with the wired and wireless inputs. In the configuration shown in FIG. 3, HDMI1 50 is coupled to a Blu-ray player, HDMI2 52 is coupled to a receiver, component 54 is coupled to a STB (set top box), Wi-Fi input 56 shows two wireless devices (device1 and device2), and Ethernet input 58 is coupled to the internet. It is appreciated that the configuration illustrated in FIG. 3 is illustrative only, and that any number of devices may be coupled to inputs accordingly.

The TV 12 preferably comprises a graphical user interface 52 (viewable on display 20), wherein the user may select from the inputs the desired content for display. As shown in FIG. 3, device1 14 and device2 16 are wireless devices coupled to the TV via Wi-Fi input 56 that are chosen as the selected inputs 64. Form here, the user interface allows the user to select how the devices are to be displayed (e.g. split screen, picture-in-picture, etc) as the input display mode 66. Display mode 66 may split the outputs from the selected devices and assign them to portions of the display output based on user preferences.

In the example shown in FIG. 3, device1 is output on a left horizontal split screen, with device2 being output on the right. It is appreciated that the two devices may be switched per the user's preference, or have a center screen output for a third device. The screen may also have different split configurations, e.g. the screens may be split vertically, with device1 displayed on top and device2 displayed on bottom.

It is also appreciated that the user may select a wireless input of one or more portable devices (14, 16 or 18), along with an input from a wired device (e.g. Blu-ray player at HDMI input 50, or STB at component input 54), and allow the user to display both on the TV 12 display 20. For example, one person may be viewing a TV program from the STB, while another is viewing output from a PSP 14. The PSP image may be a picture in picture of the STB TV program, or be split screen according the users' preferences.

FIG. 4 shows a schematic view of a portable device 14 configured to be coupled to wirelessly output to a TV 12 in accordance with the present invention. Device 14 will generally comprise a processor 70 configured to execute device application 72 (stored in memory 74) via input from keypad/controls 35. The device 14 will generally comprise a wireless transceiver 30 for sending and receiving data signals.

Device application 72 may further comprise an input/control module for receiving and interpreting input from controls 35. Device application 72 may also comprise a video/audio module 82 that is configured to output visual data to a display 32 and/or for wireless transmission via transceiver 30 via communication module 84. Thus, video/audio module 82 is configured to send visual data to display 32 and to TV 12 so that user could see both displays simultaneously. The device application software 72 may further comprise programming for executing a game, video, or other application for output on a display 20.

FIG. 5 shows a flow diagram of a method 100 for receiving a plurality of wireless devices as an input for multi-view display on a TV. At block 102, communication is initiated between portable device 14, 16, or 18 and TV 12. This may comprise a "sync" operation from either the portable device 14, 16, or 18 or TV 12. At block 104, the TV receives an input signal from one or more portable device wireless outputs 34, 36, 38. At block 106, the application software 42 identifies the device (e.g. as a PSP, etc). At block 108 the application software 42 populates the TV 12 input list 60 with the identified device, and other devices. At step 110, the application software 42 provides a graphical user interface allowing selection of one or more devices in the input list 60 for output on the display 20. Finally, at step 112, the selected device signal is output for display.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

As can be seen, therefore, the present invention includes the following inventive embodiments among others:

1. A system for multi-view output of one or more wireless portable devices, comprising; a processor; a wireless transceiver coupled to said processor; and programming executable on said processor for carrying out steps comprising: receiving a wireless output signal from a first portable device with said wireless transceiver; identifying said first portable device; displaying the identity of the first portable device in an input list comprising one or more inputs; selecting said first portable device for output on a display; displaying said first portable device wireless output signal.

2. The system of embodiment 1, wherein the processor is coupled to a TV, and wherein the first device output is displayed on said TV.

3. The system of embodiment 2, wherein said programming executable on said processor is further configured for carrying out steps comprising: receiving a wireless output signal from a second portable device with said wireless transceiver; identifying said second portable device; displaying the identity of the second portable device in the input list; selecting said first portable device and said second portable device for output on the display; and displaying said first portable device wireless output signal simultaneous with said second portable device wireless output signal.

4. The system of embodiment 3, wherein said programming executable on said processor is further configured for carrying out steps comprising: designating an output display mode for the first and second portable device wireless output signals; wherein said display mode assigns the first portable device wireless output signal to a first portion of the display output and the second portable device wireless output signal to a second portion of the display output.

5. The system of embodiment 4, wherein the display output may be split between the first portion and the second portion of the display.

6. The system of embodiment 5, wherein the display output may assigned to split the first portion and the second portion horizontally, vertically, or picture-in-picture.

7. The system of embodiment 1, wherein the first portable device comprises programming configured to output a video signal wirelessly.

8. The system of embodiment 7, wherein the first device comprises a gaming device configured to output a video signal of a display associated with the device.

9. A system for multi-view output of one or more wireless portable devices, comprising; a processor; a wireless transceiver coupled to said processor; and programming executable on said processor for carrying out steps comprising: receiving a first wireless output signal from a first portable device with said wireless transceiver; receiving a second wireless output signal from a second portable device with said wireless transceiver; identifying said first portable device and second portable device; displaying the identity of the first portable device and second portable device in an input list comprising one or more inputs; selecting said first portable device and second portable device for output on a display; displaying the first wireless output signal simultaneous with the second wireless output signal on said display.

10. The system of embodiment 9, wherein the processor is coupled to a TV, and wherein the first device output and second device output are displayed on said TV.

11. The system of embodiment 10, wherein said programming executable on said processor is further configured for carrying out steps comprising: designating an output display mode for the first wireless output signals; wherein said display mode assigns the first wireless output signal to a first portion of the display output and the second wireless output signal to a second portion of the display output.

12. The system of embodiment 11, wherein the display output may be split between the first portion and the second portion of the display.

13. The system of embodiment 12, wherein the display output may assigned to split the first portion and the second portion horizontally, vertically, or picture-in-picture.

14. The system of embodiment 9, wherein first portable device and second portable device comprise programming configured to output a video signal wirelessly.

15. The system of embodiment 14, wherein the first and second portable devices comprise a gaming device configured to output a video signal of a display associated with the device.

16. A method for multi-view output of one or more wireless portable devices, comprising; receiving a first wireless output signal from a first portable device; receiving a second wireless output signal from a second portable device; identifying said first portable device and second portable device; displaying the identity of the first portable device and second portable device in an input list comprising one or more inputs; selecting said first portable device and second portable device for output on a display; and displaying the first wireless output signal simultaneous with the second wireless output signal on said display.

17. The method of embodiment 16, further comprising: designating an output display mode for the first wireless output signals; wherein said display mode assigns the first wireless output signal to a first portion of the display output and the second wireless output signal to a second portion of the display output.

18. The method of embodiment 17, wherein the display output may be split between the first portion and the second portion of the display.

19. The method of embodiment 18, wherein the display output may assigned to split the first portion and the second portion horizontally, vertically, or picture-in-picture.

20. The method of embodiment 19, wherein the first and second portable devices comprise a gaming device configured to output a video signal of a display associated with the device.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for multi-view output of one or more wireless portable devices on a display, the display comprising a plurality of inputs for displaying content from one or more devices, comprising:
    a processor;
    a wireless transceiver coupled to said processor; and
    programming executable code on said processor for carrying out steps comprising:
        receiving a wireless output signal from a first portable device with said wireless transceiver;
        said first portable device being associated with a first user for control of the first portable device by said first user;
        identifying said first portable device;
        receiving a wireless output signal from a second portable device with said wireless transceiver;
        said second portable device being associated with a second user for control of said second portable device by said second user;
        identifying said second portable device;
        populating an input list with the identified first and second portable devices;
        providing a graphical user interface for displaying a first portable device ID and a second portable device ID in the input list, the graphical user interface allowing selection of one or more of the first and second portable devices for display;
        selecting said first portable device and said second portable device for output on the display; and
        displaying said first portable device wireless output signal simultaneous with said second portable device wireless output signal, wherein a position of a display of said first portable device wireless output signal and said second portable device wireless output signal is switchable.

2. A system as recited in claim 1, wherein the system comprises a TV, and wherein the first device output is displayed on said TV.

3. A system as recited in claim 1, wherein said programming executable on said processor is further configured for carrying out steps comprising:
    designating an output display mode for the first and second portable device wireless output signals;
    wherein said display mode assigns the first portable device wireless output signal to a first portion of the display output and the second portable device wireless output signal to a second portion of the display output.

4. A system as recited in claim 3, wherein the display output is split between the first portion and the second portion of the display.

5. A system as recited in claim 4, wherein the display output is assigned to split the first portion and the second portion horizontally, vertically, or picture-in-picture.

6. A system as recited in claim 1, wherein the first portable device comprises programming configured to output a video signal wirelessly.

7. A system as recited in claim 6, wherein the first device comprises a gaming device configured to output a video signal of a display associated with the device.

8. A system as recited in claim 1, wherein the graphical user interface is further configured for allowing selection of an input from a wired device and displaying output from the wired device simultaneous with the first or second portable devices.

9. A system for multi-view output of one or more wireless portable devices on a display, the display comprising a plurality of inputs for displaying content from one or more devices, the system comprising:
    a processor;
    a wireless transceiver coupled to said processor; and
    programming executable on said processor for carrying out steps comprising:
        receiving a first wireless output signal from a first portable device with said wireless transceiver;
        said first portable device being associated with a first user for control of the first portable device by said first user;
        receiving a second wireless output signal from a second portable device with said wireless transceiver;
        said second portable device being associated with a second user for control of said second portable device by said second user;
        identifying said first portable device and second portable device;
        populating an input list with the identified first and second portable devices;
        providing a graphical user interface for displaying a first portable device ID and a second portable device ID in the input list corresponding to the one or more inputs, the graphical user interface allowing selection of one or more of the first and second portable devices for display;
        selecting said first portable device and second portable device for output on a display;
        displaying the first wireless output signal simultaneous with the second wireless output signal on said display, wherein a position of a display of said first portable device wireless output signal and said second portable device wireless output signal is switchable.

10. A system as recited in claim 9, wherein the system comprises a TV, and wherein the first device output and second device output are displayed on said TV.

11. A system as recited in claim 10, wherein said programming executable on said processor is further configured for carrying out steps comprising:
    designating an output display mode for the first and second portable device wireless output signals;
    wherein said display mode assigns the first wireless output signal to a first portion of the display output and the second wireless output signal to a second portion of the display output.

12. A system as recited in claim 11, wherein the display output is split between the first portion and the second portion of the display.

13. A system as recited in claim 12, wherein the display output is assigned to split the first portion and the second portion horizontally, vertically, or picture-in-picture.

14. A system as recited in claim 9, wherein first portable device and second portable device comprise programming configured to output a video signal wirelessly.

15. A system as recited in claim 14, wherein the first and second portable devices comprise a gaming device configured to output a video signal of a display associated with the device.

16. A method for multi-view output of one or more wireless portable devices on a display, the display comprising a plurality of inputs for displaying content from one or more devices, the method comprising:

receiving a first wireless output signal from a first portable device as a first input of the display;

said first portable device being associated with a first user for control of the first portable device by said first user;

receiving a second wireless output signal from a second portable device with said wireless transceiver;

said second portable device being associated with a second user for control of said second portable device by said second user;

identifying said first portable device and second portable device;

populating an input list with the identified first and second portable devices;

providing a graphical user interface for displaying a first portable device ID and a second portable device ID in the input list corresponding to the one or more inputs, the graphical user interface allowing selection of one or more of the first and second portable devices for display;

selecting said first portable device and second portable device for output on a display; and displaying the first wireless output signal simultaneous with the second wireless output signal on said display, wherein the first wireless output signal is displayed in a left horizontal split screen, and the second wireless output signal is displayed in a right horizontal split screen, wherein a position of a display of said first portable device wireless output signal and said second portable device wireless output signal is switchable, further wherein a third wireless output signal is displayed as a center screen output.

17. A method as recited in claim 16, further comprising:

designating an output display mode for the first and second portable device wireless output signals;

wherein said display mode assigns the first wireless output signal to a first portion of the display output and the second wireless output signal to a second portion of the display output.

18. A method as recited in claim 17, wherein the display output is split between the first portion and the second portion of the display.

19. A method as recited in claim 18, wherein the display output is assigned to split the first portion and the second portion horizontally, vertically, or picture-in-picture.

20. A method as recited in claim 19, wherein the first and second portable devices comprise a gaming device configured to output a video signal of a display associated with the device.

21. A display comprising:

a multi-view output;

a plurality of inputs for displaying content from one or more device;

a processor;

a wireless transceiver coupled to said processor; and a programming executable code on said processor configured to:

receive a wireless output signal from a plurality of portable devices with said wireless transceiver;

identify the plurality of portable devices;

populate an input list with the plurality of portable devices;

provide a graphical user interface for displaying identifications of the plurality of portable devices in the input list and for selecting at least one of the portable devices for display for output on the display; and display wireless output signals simultaneously of the plurality of portable devices, including a first portable device output signal and a second portable device output signal, wherein a position of the display of the first portable device output signal and the second portable device wireless output signal is switchable.

22. The display of claim 21, wherein the display output of the multi-view output is split between a first portion associated with a first portable device and a second portion associated with a second portable device.

23. The display of claim 22, wherein the display output splits the first portion and the second portion horizontally, vertically, or picture-in-picture.

24. The display of claim 21, wherein the display is configured to receive signal from a first portable device that has programming configured to output a video signal wirelessly.

25. The display of claim 24, wherein the display is configured to receive signal from the first device which is a gaming device configured to output a video signal of a device display associated with the first device.

26. The display of claim 21, wherein the graphical user interface is further configured for allowing selection of an input from a wired device and displaying output for the wired device simultaneous with a first or second portable device.

* * * * *